United States Patent
Tanaka

(10) Patent No.: US 9,716,532 B2
(45) Date of Patent: Jul. 25, 2017

(54) POWER RECEIVER, METHOD OF CONTROLLING POWER RECEIVER, AND PROGRAM

(71) Applicant: CANON KABUSHIKI KAISHA, Tokyo (JP)

(72) Inventor: Yu Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 13/759,912

(22) Filed: Feb. 5, 2013

(65) Prior Publication Data
US 2014/0217828 A1    Aug. 7, 2014

Related U.S. Application Data

(63) Continuation of application No. PCT/JP2012/053064, filed on Feb. 10, 2012.

(51) Int. Cl.
  *H04B 5/00* (2006.01)
(52) U.S. Cl.
  CPC ......... *H04B 5/0037* (2013.01); *H04B 5/0075* (2013.01)
(58) Field of Classification Search
  CPC ........................... H04B 5/0037; H04B 5/0075
  See application file for complete search history.

(56) References Cited

U.S. PATENT DOCUMENTS

| | | | | |
|---|---|---|---|---|
| 6,271,764 B1* | 8/2001 | Okamura | ...................... | 340/7.2 |
| 8,903,456 B2* | 12/2014 | Chu et al. | ..................... | 455/567 |
| 2011/0316476 A1* | 12/2011 | Washiro | ....................... | 320/108 |
| 2012/0043932 A1* | 2/2012 | Nakama | ............... | H02J 7/0004 320/108 |
| 2012/0052923 A1* | 3/2012 | Park | ....................... | H02J 7/025 455/567 |
| 2012/0091950 A1* | 4/2012 | Campanella | ........... | H02J 5/005 320/108 |
| 2014/0062395 A1* | 3/2014 | Kwon | ................. | H04B 5/0037 320/108 |
| 2015/0078461 A1* | 3/2015 | Lee et al. | ..................... | 375/256 |

FOREIGN PATENT DOCUMENTS

| | | | | |
|---|---|---|---|---|
| JP | 2000-358085 A | 12/2000 | | |
| JP | 2001-197674 A | 7/2001 | | |
| JP | 2010-268609 A | 11/2010 | | |
| JP | WO 2010131776 A1 * | 11/2010 | ........... | H02J 7/0004 |
| JP | 2011-151467 A | 8/2011 | | |

* cited by examiner

*Primary Examiner* — Thienvu Tran
*Assistant Examiner* — Pinping Sun
(74) *Attorney, Agent, or Firm* — Canon U.S.A., Inc. IP Division

(57) ABSTRACT

User convenience is reduced if vibration of a power receiver is inhibited when the power receiver is receiving power through a cable or when the power transmitting region is large and vibration of the power receiver does not cause the power receiver to deviate from a power transmitting region of a power transmitter. It is desired to selectively inhibit the vibration of the power receiver during power reception, depending on the power reception status. The power receiver includes a vibrating unit, and includes a power receiving unit configured to receive power, an identifying unit configured to identify a power reception technique used in the power receiving unit when the power receiving unit receives the power, and an inhibiting unit configured to inhibit the vibrating unit from vibrating in accordance with the identification by the identifying unit.

11 Claims, 4 Drawing Sheets

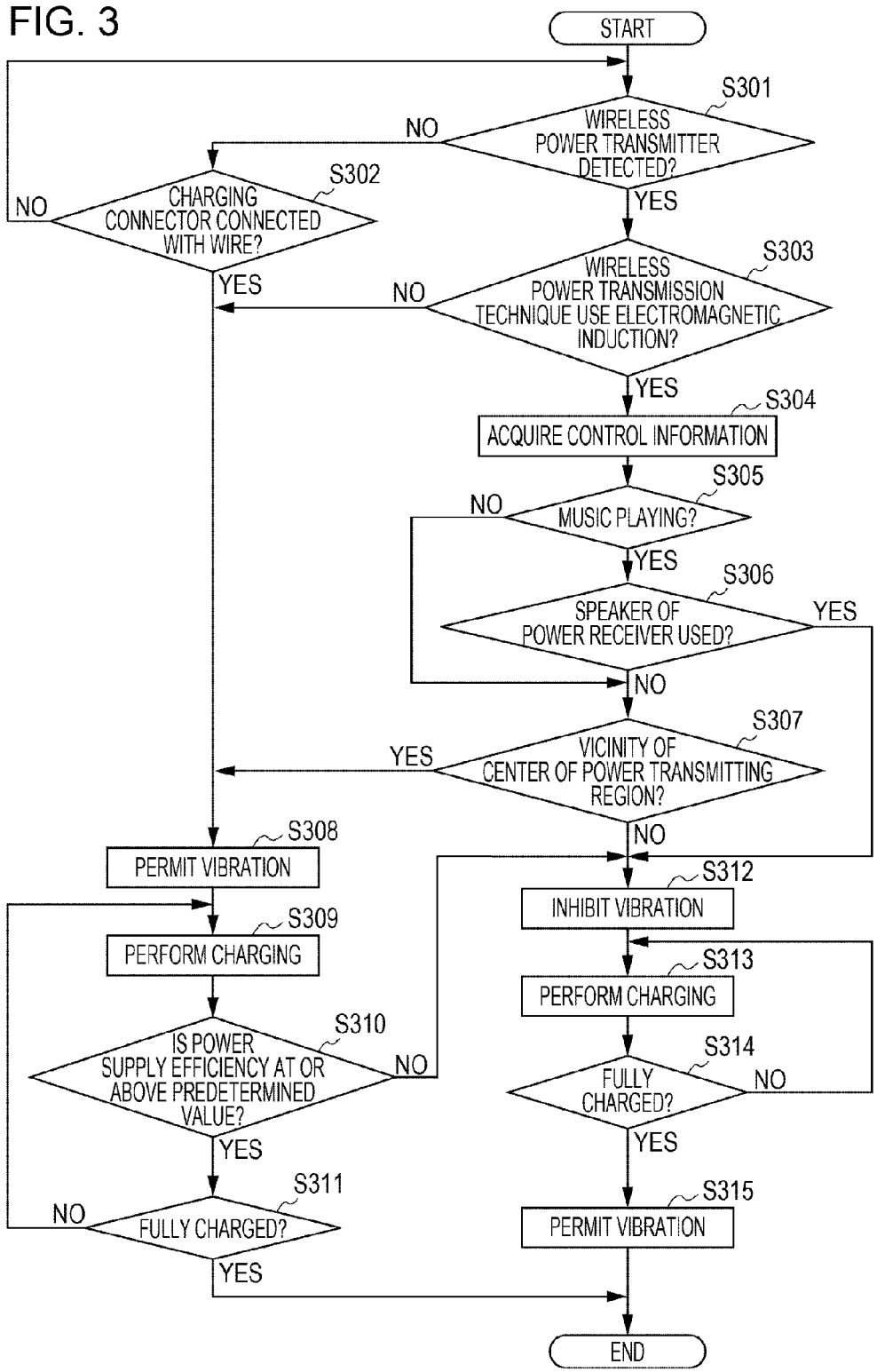

POWER RECEIVER, METHOD OF CONTROLLING POWER RECEIVER, AND PROGRAM

TECHNICAL FIELD

The present invention relates to vibration control in a power receiver.

BACKGROUND ART

Recently, attention has been focused on wireless power supply techniques of supplying power without a cable. The electromagnetic induction technique, which is one of the wireless power supply techniques, supplies power by generating an induced current between a coil of a power supply device and a coil of a power receiver. The magnetic resonance technique, which is another one of the wireless power supply techniques, supplies power by causing an electrical resonance phenomenon between a coil of a power supply device and a coil of a power receiver. The magnetic resonance technique can supply power over longer distances than that of the electromagnetic induction technique.

With the wireless power supply techniques, the power supply efficiency may decrease depending on the positional relationship between the coils. A method is proposed of suppressing a decrease in the power supply efficiency by enlarging a region where the power supply efficiency is high (hereinafter referred to as "power supply region") by the use of a movable power-supply coil or the use of a plurality of power-supply coils. In Japanese Patent Laid-Open No. 2001-197674, a method is proposed of suppressing a decrease in the power supply efficiency by inhibiting vibration of a power receiver during power supply when the power receiver includes a vibrating unit, for example, when the power receiver is a cellular phone.

However, even while the power receiver receives power, inhibition of vibration of the power receiver may be unnecessary. For example, it is unnecessary when the power receiver is receiving power through a cable or when the power transmitting region of the power transmitter is large and vibration of the power receiver does not cause the power receiver to deviate from the power transmitting region.

If vibration of the power receiver is inhibited in such cases, a user is unable to notice, for example, an incoming call or a predetermined time by vibration, and user convenience decreases.

In light of the above problem, it is an object of the instant subject matter to selectively inhibit vibration of a power receiver during power reception, depending on the power reception status. In another aspect of the present invention, it is an object to notify a user of inhibition of vibration of the power receiver during power reception.

SUMMARY OF INVENTION

A power receiver for achieving the above objects is a power receiver including a vibrating unit. The power receiver includes a power receiving unit configured to receive power, an identifying unit configured to identify a power reception technique used in the power receiving unit when the power receiving unit receives the power, and an inhibiting unit configured to inhibit the vibrating unit from vibrating in accordance with the identification by the identifying unit.

A power receiver according to another aspect of the present invention is a power receiver including a vibrating unit. The power receiver includes a power receiving unit configured to wirelessly receive power, an inhibiting unit configured to inhibit the vibrating unit from vibrating when the power receiving unit receives the power, and a notifying unit configured to, when the inhibiting unit inhibits the vibrating unit from vibrating, notify a user that the vibrating unit is inhibited from vibrating.

Further features of the present invention will become apparent from the following description of exemplary embodiments with reference to the attached drawings.

BRIEF DESCRIPTION OF DRAWINGS

FIG. 3 is a flowchart of operation of a power receiver in the wireless power supply system.

DESCRIPTION OF EMBODIMENTS

Embodiments

Figure 1:
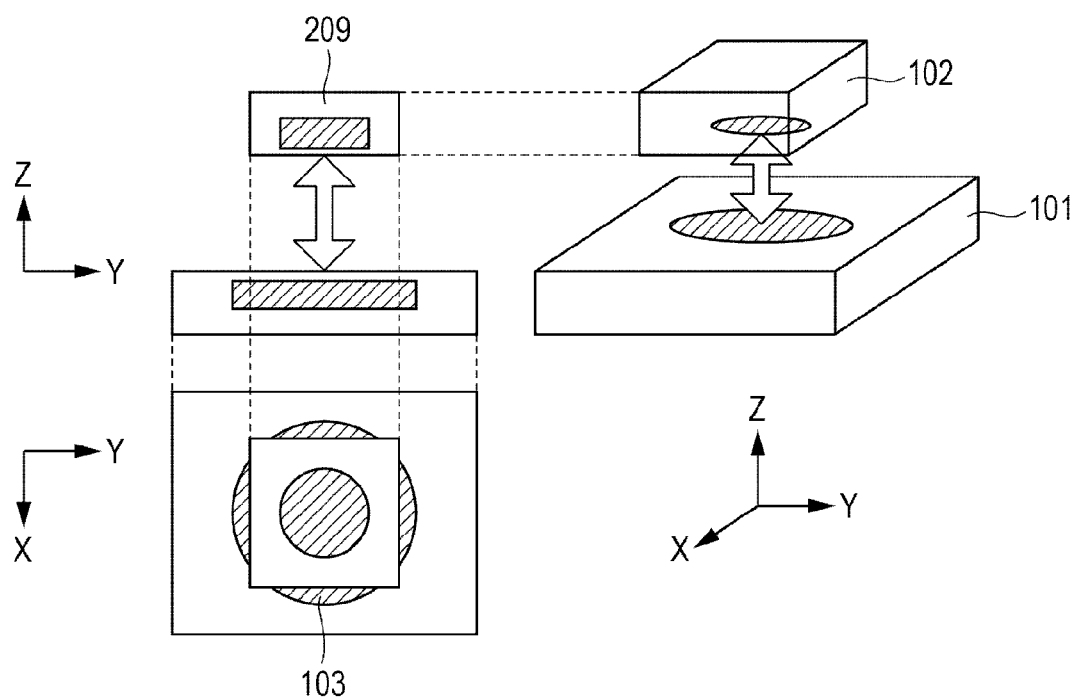
FIG. 1 illustrates a configuration of a wireless power supply system.

FIG. 1 illustrates a configuration of a wireless power supply system according to a first embodiment.

The wireless power supply system includes a wireless power transmitter (e.g., charging base) 101 that transmits power and a power receiver (e.g., camera or mobile phone) 102 that receives power. A power transmitting unit 208 in the wireless power transmitter 101 defines a power transmitting region 103 through which power can be transmitted. When entering the power transmitting region 103 of the wireless power transmitter 101, a wireless power-receiving unit 209 in the power receiver 102 receives power using electromagnetic induction. The system may supply power by magnetic resonance instead of electromagnetic induction.

Figure 2:
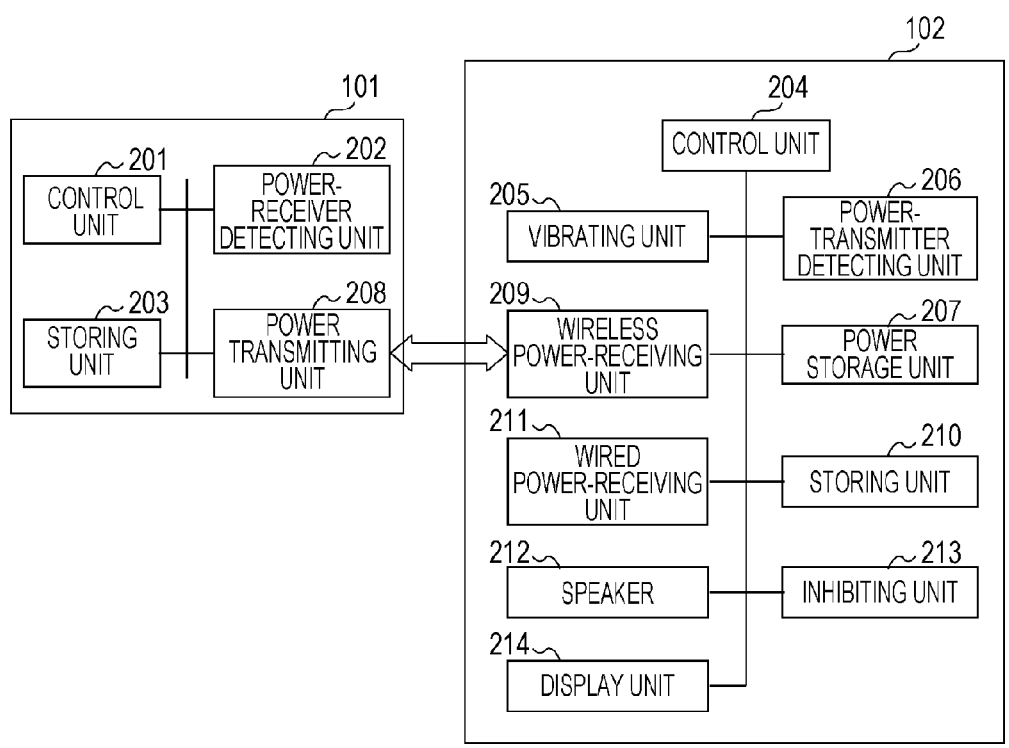
FIG. 2 is a block diagram that illustrates a functional configuration of the wireless power supply system.

FIG. 2 illustrates the hardware configuration of the wireless power transmitter 101 and power receiver 102. The wireless power transmitter 101 includes a control unit 201, a power-receiver detecting unit 202, a storing unit 203, and the power transmitting unit 208.

The control unit (specifically, processor) 201 provides overall control on the wireless power transmitter 101. The power-receiver detecting unit 202 detects positional information indicating the position where the power receiver 102 is placed. Specifically, the power-receiver detecting unit 202 determines the position of the wireless power-receiving unit 209 in the power receiver 102 using at least one of a pressure sensor and an ultrasonic sensor included in the wireless power transmitter 101 and the amount of change of electromagnetic characteristic of the surface of the wireless power transmitter 101 with respect to time. Instead of the position itself, information indicating the distance from the power transmitting unit 208 acquired by calculation of the length between the power transmitting unit 208 in the wireless power transmitter 101 and the wireless power-receiving unit 209 in the power receiver 102 may be used.

The storing unit 203 stores configuration information on the power transmitting unit 208. Here, the configuration information contains the maximum transmission electric power of the power transmitting unit 208 and information about a power transmission coil (such as information indicating whether the power transmission coil of the power transmitting unit 208 is movable; if so, information indicating whether the power transmission coil can be tracked; information indicating whether a plurality of power transmission coils are used, etc.).

The storing unit 203 includes memory, such as read-only memory (ROM) or random-access memory (RAM). The storing unit 203 is not limited to the above memory. The storing unit 203 may include a storage medium, such as a flexible disk, hard disk, optical disk, magneto-optical disk, compact-disk ROM (CD-ROM), CD recordable (CD-R), magnetic tape, nonvolatile memory card, or digital versatile disk (DVD). The power transmitting unit 208 transmits power using electromagnetic induction.

The power receiver 102 includes a control unit 204, a vibrating unit 205, a wireless-power-transmitter detecting unit 206, a wireless power-receiving unit 209, a power storage unit 207, a storing unit 210, a wired power-receiving unit 211, a speaker 212, and an inhibiting unit 213.

The control unit (for example, a processor) 204 provides overall control on the power receiver 102 and acquires the amount of power received by the wireless power-receiving unit 209 and the amount of power stored in the power storage unit 207. The vibrating unit 205 has the function of causing the power receiver 102 to vibrate in whole or in part, and is used to notify a user of, for example, a predetermined time or incoming data.

The wireless-power-transmitter detecting unit 206 detects a wireless power transmitter by sensing an alert signal (for example, Ping signal) regularly sent from the wireless power transmitter. The power storage unit 207 stores power received from the wireless power-receiving unit 209 and wired power-receiving unit 211. The wireless power-receiving unit 209 receives power from the wireless power transmitter charged by electromagnetic induction.

The storing unit 210 stores a program for achieving a flowchart described below by the control unit 201. The storing unit 210 includes memory, such as ROM or RAM. The storing unit 210 is not limited to the above memory. The storing unit 210 may include a storage medium, such as a flexible disk, hard disk, optical disk, magneto-optical disk, CD-ROM, CD-R, magnetic tape, nonvolatile memory card, or DVD.

The wired power-receiving unit 211 includes a charging connector, receives power from a mains power source through a wire, and stores the power in the power storage unit 207. The power may be received using universal serial bus (USB) bus power instead of the mains power source. The speaker 212 outputs sound when music is played. The inhibiting unit 213 inhibits the vibrating unit 205 from vibrating. A reference numeral 214 denotes a display unit for use in providing a user with various notifications.

FIG. 3 is a flowchart of operation of the power receiver 102 in the wireless power supply system according to the present embodiment. This flowchart is achieved by the control unit 204 in the power receiver 102 reading the program stored in the storing unit 210.

In S301, the wireless-power-transmitter detecting unit 206 detects a wireless power transmitter (here, wireless power transmitter 101). The detection is made by receipt of an alert signal (ping) sent from the wireless power transmitter 101.

When no wireless power transmitter has been detected, the wired power-receiving unit 211 determines whether the charging connector is wire-connected (S302). When it is wire-connected, the process proceeds to S308. When it is not wire-connected, the process returns to S301.

When a wireless power transmitter is detected, the wireless-power-transmitter detecting unit 206 determines the wireless power transmission technique used in the detected wireless power transmitter on the basis of notification from the detected wireless power transmitter (S303). When the wireless power transmission technique uses electromagnetic induction, the process proceeds to S304. When it does not (for example, if it uses magnetic resonance), the process proceeds to S308.

In S304, the control unit 204 acquires control information from the wireless power transmitter 101. The control information is for example positional information on the wireless power-receiving unit 209 and configuration information on the power transmitting unit 208. Here, the power receiver 102 makes a request to the wireless power transmitter 101 for the control information, and the control information is sent in response to the request. However, this is merely an example. The wireless power transmitter 101 may send the control information in response to detection by the power receiver 102.

Then, in S305, the control unit 201 determines whether the power receiver 102 is playing music. When it is not playing music, the process proceeds to S307. When the power receiver 102 is playing music, the control unit 201 determines whether the sound is being output using the speaker 212 or output through a wire, for example, by the use of another speaker different from the speaker 212 in a stereo system (S306).

When the sound is being output using the speaker 212, the process proceeds to S312, and the inhibiting unit 213 inhibits the vibrating unit 205 from vibrating. This can suppress a decrease in power supply efficiency caused by a large change in the positional relationship between the wireless power transmitter 101 and power receiver 102 resulting from, in addition to vibration created by the speaker 212 outputting sound, vibration by the vibrating unit 205. Noise to music produced by vibration of the power receiver 102 during playing of the music can be prevented.

When the sound is being output using another speaker different from the speaker 212, the process proceeds to S307, and the control unit 204 determines on the basis of the control information whether the center of the wireless power-receiving unit 209 is present in the vicinity of the center (central region) of the power transmitting region (S307). Specifically, the control unit 204 determines whether the wireless power-receiving unit 209 is present in the vicinity of the center (hatched portion) illustrated in FIGS. 4A to 4C.

Figure 4A:
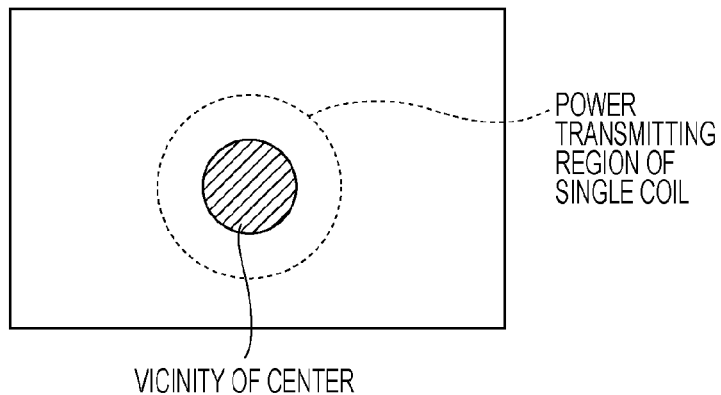
FIG. 4A illustrates the configuration of a wireless power supply system that includes a wireless power transmitter including a power transmitting unit utilizing the electromagnetic coupling technique at one location.

That is, when the wireless power transmitter 101 includes a single fixed coil (this information is contained in the configuration information), it is determined using the positional information whether the wireless power-receiving unit 209 is present in the hatched portion in FIG. 4A.

Figure 4B:
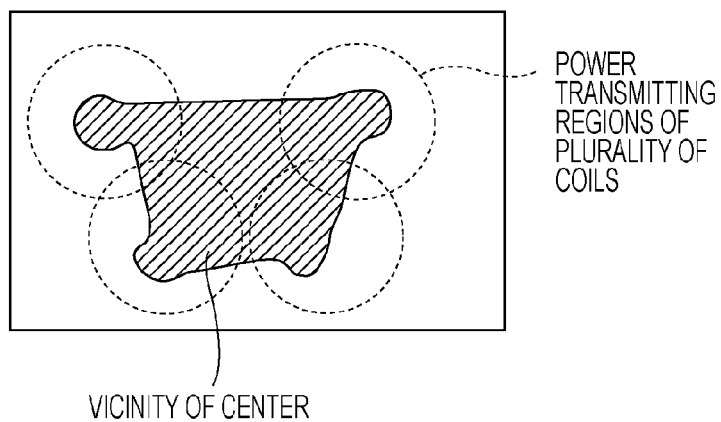
FIG. 4B illustrates a configuration of a wireless power supply system that includes a wireless power transmitter including a plurality of power transmitting units utilizing the electromagnetic coupling technique.

When the wireless power transmitter 101 includes a plurality of fixed coils (this information is contained in the configuration information), it is determined using the positional information whether the wireless power-receiving unit 209 is present in the hatched portion in FIG. 4B.

Figure 4C:
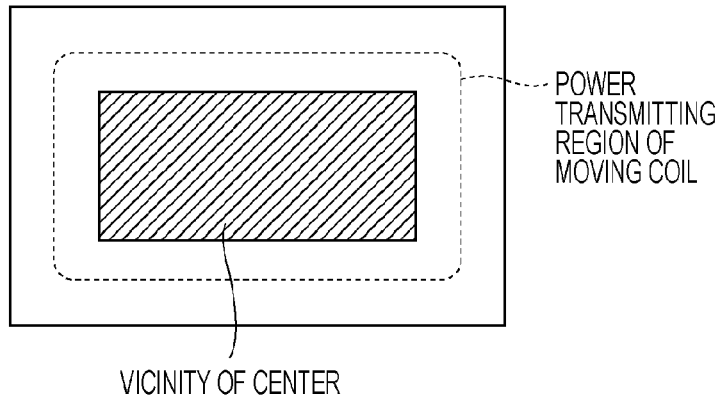
FIG. 4C illustrates a configuration of a wireless power supply system that includes a wireless power transmitter including a single power transmitting unit utilizing the electromagnetic coupling technique, the power transmitting unit being movable.

When the wireless power transmitter 101 includes a single moving coil (this information is contained in the configuration information), it is determined using the positional information whether the wireless power-receiving unit 209 is present in the hatched portion in FIG. 4C. The moving coil is a coil that moves in accordance with the position of the wireless power-receiving unit 209. In this case, the power transmitting region of the moving coil is set in accordance with the moving range of the coil. The vicinity of the center of the moving coil is the vicinity of the center of the power transmitting region set in accordance with the moving range of the coil.

When the coil or coils are present in the central region, the process proceeds to S308. When the coil or coils are not present in the central region, the process proceeds to S312.

In S308, the control unit 204 permits the vibrating unit 205 to vibrate. Accordingly, the vibrating unit 205 vibrates in notifying a user of a predetermined time or incoming data. When the power receiver is charged with a wire or when the center of the wireless power-receiving unit 209 is present in the vicinity of the power transmitting region, it is unlikely that a positional change of the wireless power-receiving unit 209 resulting from vibration of the power receiver 102 will significantly reduce the power supply efficiency. In this case, because vibration occurs in notifying a user of a predetermined time or incoming data, user convenience is enhanced.

After that, the power storage unit 207 is charged (S309). It is determined whether the power supply efficiency is equal to or larger than a predetermined value during the charging (S310). Here, when the charging uses wired connection, it is determined that the power supply efficiency is equal to or larger than the predetermined value. When the power receiver 102 receives power wirelessly, the amount of transmitted power is acquired from the wireless power transmitter 101, the acquired amount of transmitted power is compared with the amount of power actually received by the wireless power-receiving unit 209, and the power supply efficiency is calculated. When the power supply efficiency is equal to or larger than the predetermined value, the process proceeds to S309. When the power supply efficiency is less than the predetermined value, the process proceeds to S310. Here, when the power supply efficiency is less than the predetermined value, the wireless power transmitter 101 may be required to transmit increased power. This can increase the amount of received power and shorten the charging time even when the power supply efficiency is low.

Typically, the power supply efficiency in the electromagnetic induction technique is higher than that in the magnetic resonance technique. Thus, here, the predetermined value varies depending on the power transmission technique. For example, when the power transmission technique is the electromagnetic induction technique, the predetermined value may be 50%. When it is the magnetic resonance technique, the predetermined value may be 30%.

In S311, the control unit 204 determines whether the power storage unit 207 is fully charged. When it is fully charged, the charging is completed. When it is not fully charged, the process returns to S309, and the charging continues.

Then, S312 is described. In S312, the inhibiting unit 213 inhibits the vibrating unit 205 from vibrating. Alternatively, this may be achieved by disengaging the vibration mode, depending on the configuration of the power receiver 102. Accordingly, because the position of the wireless power-receiving unit 209 is not changed by vibration of the power receiver 102, the possibility of significantly reducing the power supply efficiency can be reduced. In the case where vibration is inhibited, when an event that requires notifying a user using vibration by the vibrating unit 205, such as an incoming call or alarm, occurs, sound output from the speaker 212 or light or characters displayed by the display unit 214 is used, instead of the vibration by the vibrating unit 205. This can enable the user to become aware of the incoming call or alarm even when the vibration is inhibited.

In addition, the display unit 214 notifies the user that the vibration is inhibited because there is a possibility of reducing the wireless power supply efficiency. Alternatively, the above notification may be provided to the user using the speaker 212. The user may be notified that the notification will be made by not vibration but light or sound to prevent a decrease in the wireless power supply efficiency. This can enable the user to notice that the vibration is inhibited (or vibration setting is disabled) to prevent a decrease in the wireless power supply efficiency. The user can notice that notification of an incoming call or alarm will be made by not vibration but light or sound.

After that, the power storage unit 207 is charged (S313). The control unit 204 determines whether the power storage unit 207 is fully charged (S314). When it is fully charged, vibration of the vibrating unit 205 is permitted (S315), and the charging is completed. When the power storage unit 207 is not fully charged, the process returns to S313, and the charging continues.

In the above-described manner, vibration of the power receiver during power reception can be selectively inhibited, depending on the power reception status (for example, depending on whether power is supplied through a wire, by the electromagnetic induction technique, or by the magnetic resonance technique; in the case of power supply by the electromagnetic induction technique, depending on the positional relationship between the power transmitting region and wireless power-receiving unit).

In addition, when the number of devices to which the wireless power transmitter 101 transmits power is acquired from the wireless power transmitter 101, if the power is transmitted to a plurality of devices, vibration of the vibrating unit 205 may be inhibited. This can prevent a decrease in the power supply efficiency in another power receiver caused by a change in the position of this power receiver resulting from vibration of the power receiver 102.

When the power transmitting unit 208 is large, it is unlikely that movement caused by vibration significantly reduces the power supply efficiency. Thus, the control information may contain the size (area) of the power transmitting unit 208 in the wireless power transmitter 101. In this case, when the size of the power transmitting unit 208 is larger than a predetermined size, vibration may be permitted.

According to the present invention, vibration of the power receiver during power reception can be selectively inhibited, depending on the power reception status. According to another aspect of the present invention, a user can be notified that vibration of the power receiver during power reception is inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2012/053064, filed Feb. 10, 2012, which is hereby incorporated by reference herein in its entirety.

The invention claimed is:

1. A power receiver including a vibrating unit, the power receiver comprising:
   a power receiving unit configured to receive power;
   a hardware processor configured to function as:
   a determining unit configured to determine whether the power receiver exists within a vicinity area of a center of a wireless power transmitting region of a power transmitter; and
   a controlling unit configured to control the vibrating unit according to a determining result by the determining unit such that the vibrating by the vibrating unit is not inhibited in a case where the determining unit determines that the power receiver exists within the vicinity area of the center of the wireless power transmitting region of a power transmitter and such that the vibrating by the vibrating unit is inhibited while the power receiving unit receives power wirelessly from the power transmitter in a case where the determining unit determines that the power receiver does not exist within the vicinity area of the center of the wireless power transmitting region of the power transmitter.

2. The power receiver according to claim 1, wherein the hardware processor further functions as an identifying unit configured to identify a power reception method of the power receiver, and wherein the controlling unit does not inhibit the vibrating unit from vibrating in a case where the identifying unit identifies that the method of receiving power with a wire is set for the power receiver.

3. The power receiver according to claim 2, wherein the method for receiving power wirelessly includes an electromagnetic induction method and a magnetic resonance method.

4. The power receiver according to claim 1, further comprising a speaker that outputs sound,
   wherein the controlling unit controls the vibrating unit according the determining result by the determining unit when the power receiver does not output the sound using the speaker, and the controlling unit inhibits the vibrating unit from vibrating when the power receiver outputs the sound using the speaker.

5. The power receiver according to claim 1, wherein, when the power reception by the power receiving unit is completed, the controlling unit removes the inhibition of the vibration of the vibrating unit.

6. The power receiver according to claim 1, wherein the hardware processor further functions as a notifying unit that provides a user with notification using sound or indication instead of the vibration by the vibrating unit when the controlling unit inhibits the vibrating unit from vibrating.

7. The power receiver according to claim 1, wherein the power receiving unit is configured to receive power according to control by the hardware processor.

8. A method of controlling a power receiver including a vibrating unit and a power receiving unit, the method comprising:
   a determining step of determine whether the power receiver exists within a vicinity area of a center of a wireless power transmitting region of a power transmitter; and
   a controlling step of controlling the vibrating unit according to a determining result by the determining step such that the vibrating by the vibrating unit is not inhibited in a case where the determining step determines that the power receiver exists within the vicinity area of the center of the wireless a power transmitting region of a power transmitter and such that the vibrating by the vibrating unit is inhibited while the power receiving unit receives power wirelessly from the power transmitter in a case where the determining unit determines that the power receiver does not exist within the vicinity area of the center of the wireless power transmitting region of the power transmitter.

9. The method of controlling the power receiver according to claim 8, wherein, in a case where the method of receiving power with a wire is identified in the identifying step, the vibrating unit is not inhibited from vibrating.

10. A non-transitory computer readable medium for causing a computer to execute instructions including controlling a power receiving unit for receiving power and a vibrating unit, comprising the steps of:
    determining whether the power receiver exists within a vicinity area of a center of a wireless power transmitting region of a power transmitter; and
    controlling the vibrating unit according to a determining result such that the vibrating by the vibrating unit is not inhibited in a case where the power receiving unit exists within the vicinity area of the center of the wireless power transmitting region of a power transmitter and such that the vibrating by the vibrating unit is inhibited while the power receiving unit receives power wirelessly from the power transmitter in a case where it is determined that the power receiver does not exist within the vicinity area of the center of the wireless power transmitting region of the power transmitter.

11. The medium according to claim 10, wherein, in a case where the method of receiving power with a wire is identified in the identifying step, the vibrating unit is not inhibited from vibrating.

* * * * *